Figure 1:
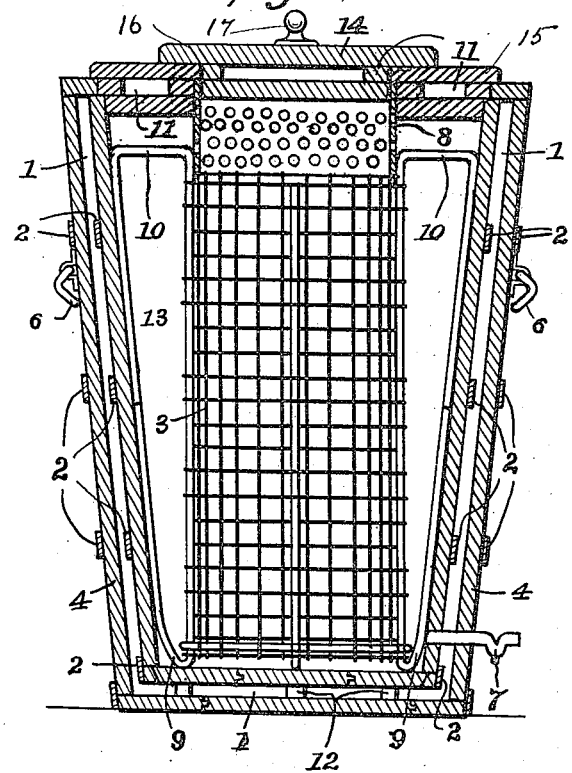

Jan. 30, 1923.

A. J. VERVILLE.
THERMOS ICE CREAM CABINET
FILED JAN. 4, 1922.

1,443,934.

Inventor.
Archie J. Verville,
By John A. Saul,
Attorney.

Patented Jan. 30, 1923.

1,443,934

UNITED STATES PATENT OFFICE.

ARCHIE J. VERVILLE, OF HANCOCK, MICHIGAN.

THERMOS ICE-CREAM CABINET.

Application filed January 4, 1922. Serial No. 526,914.

*To all whom it may concern:*

Be it known that I, ARCHIE J. VERVILLE, a citizen of the United States, residing at Hancock, in the county of Houghton and State of Michigan, have invented certain new and useful Improvements in Thermos Ice Cream Cabinets, of which the following is a specification.

My invention relates to ice cream cabinets, and more particularly to thermos ice cream cabinets, for use at soda fountains, ice cream stands, creameries, and like places, the same being adapted to hold the cold air in the receptacle and obtain the maximum of benefit therefrom.

The object is to so construct the device that it can be easily and cheaply manufactured, will be efficient, durable, and easily manipulated.

In the drawings forming a part of this specification, and in which like symbols of reference represent corresponding parts in the several views:—

Figure 2:
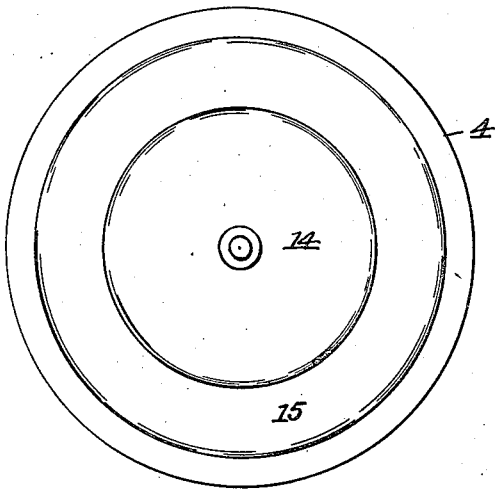

Figure 1 is a vertical section of the cabinet, showing the inner and outer walls of the same;

Figure 2 a plan view of the device; and

Figure 3:
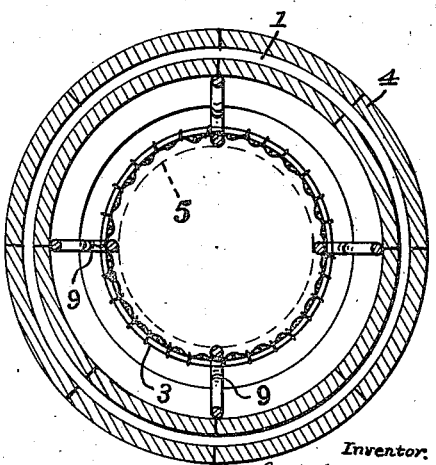

Figure 3 a horizontal section.

In the drawings the numeral 1 represents the dead air space between the inner and outer walls of the cabinet; 2 galvanized iron hoops for inner and outer walls of cabinet; 3 the can container, composed of heavy galvanized iron or copper wire; and 4 is the outer casing. 5 represents the ice cream can; 6 galvanized iron drop handles; and 7 water seal galvanized drain pipe.

8 is a removable curtain or sleeve for protecting the can container and for convenience in removing empty cans; 9 is the lower portion of spring wires 10, said lower portion acting as feet or supports to steady the can container and being connected to same at top and bottom, as shown. These braces or springs 10 are made of galvanized iron wire and enable the can container to be lifted out of the cabinet by the same and also hold the container firmly in the cabinet.

15 is the cover of the ice chamber 13; 11 dead air space in said cover; and 16 main cover having dead air space 14. 12 are blocks or feet supporting inside cabinet walls; and 17 is a knob or handle for the main cover.

The operation of the cabinet will be apparent from the foregoing description. The main cover is easily lifted from the cabinet, when the cover 15 can then be removed and with it the apron or curtain, for whilst said apron is removable with the cover it can, when desired, be detached from same. After the covers have been removed the cans and also the container can be lifted out of the cabinet by the wires 10. The container is preferably constructed of wood, usually white cedar, the inner casing to have a coat of asphaltum, and the inside of inner casing to have a coat of linseed oil and white lead.

Having now fully described my invention, what I claim as new, and desire to secure by Letters-Patent, is:—

1. An ice cream cabinet, a can container for the same, said can container having springs extending from its upper and lower portions so as to contact with the cabinet and hold the container firmly in place and having the upper portion of the spring extending sufficiently beyond the container to enable it to be used as a handle to lift the container from the cabinet.

2. An ice cream cabinet, a can container for the same, a plurality of covers for the cabinet, and an apron depending from the outer cover to inclose the ice chamber of the cabinet.

In testimony whereof I affix my signature.

ARCHIE J. VERVILLE.